United States Patent
Douglas (10) Patent No.: US 8,070,100 B2
(45) Date of Patent: Dec. 6, 2011

(54) AIRCRAFT STRUCTURE

(75) Inventor: Paul Douglas, Bristol (GB)

(73) Assignee: Airbus Operations Limited, Bristol (GB)

(*) Notice: Subject to any disclaimer, the term of this patent is extended or adjusted under 35 U.S.C. 154(b) by 504 days.

(21) Appl. No.: 12/382,265

(22) Filed: Mar. 12, 2009

(65) Prior Publication Data

US 2010/0065687 A1 Mar. 18, 2010

(30) Foreign Application Priority Data

Apr. 2, 2008 (GB) .................................. 0805963.6

(51) Int. Cl.
*B64C 1/00* (2006.01)
(52) U.S. Cl. ................ 244/123.1; 244/123.14; 244/132
(58) Field of Classification Search ............. 244/123.14, 244/123.1, 124, 123.7, 131, 132
See application file for complete search history.

(56) References Cited

U.S. PATENT DOCUMENTS

| | | | |
|---|---|---|---|
| 2,164,531 A | 7/1939 | Lee | |
| 2,334,975 A | 11/1943 | Williams | |
| 2,742,247 A | 4/1956 | Lachmann | |
| 2,774,555 A | 12/1956 | Crawford et al. | |
| 3,716,209 A | 2/1973 | Pierce | |
| 4,053,124 A | 10/1977 | Cole | |
| 4,351,502 A | 9/1982 | Statkus | |
| 7,770,846 B2* | 8/2010 | Perez Rodriguez et al. .. | 244/209 |
| 7,909,290 B2* | 3/2011 | Cooper ......................... | 244/132 |
| 7,992,822 B2* | 8/2011 | Kato et al. .................... | 244/132 |
| 2010/0077690 A1* | 4/2010 | Durand .......................... | 52/578 |

OTHER PUBLICATIONS

UK Search Report for Great Britain Application No. 0805963.6, dated Jul. 23, 2008.

* cited by examiner

*Primary Examiner* — J. Woodrow Eldred
(74) *Attorney, Agent, or Firm* — Nixon & Vanderhye P.C.

(57) ABSTRACT

An aircraft structure comprising: a spar; a primary cover attached to the spar and extending on a first side of the spar; and a secondary cover positioned on a second side of the spar and partially overlapping an internal surface of the primary cover. A bracket is attached to the spar, and a spacer is provided between the secondary cover and the bracket. The spacer is sized so that the primary and secondary covers together form a substantially continuous external aerodynamic surface. The structure provides an alternative to conventional butt-strap arrangements.

12 Claims, 8 Drawing Sheets

AIRCRAFT STRUCTURE

This application claims priority to Great Britain Patent Application No. 0805963.6, filed 2 Apr. 2008, the entire content of which is hereby incorporated by reference.

FIELD OF THE INVENTION

The present invention relates to an aircraft structure comprising: a spar; a primary cover attached to the spar and extending on a first side of the spar; and a secondary cover positioned on a second side of the spar. In particular, the invention relates to a structure and assembly method which ensures that the covers form a substantially continuous external aerodynamic surface.

BACKGROUND OF THE INVENTION

Figure 1:
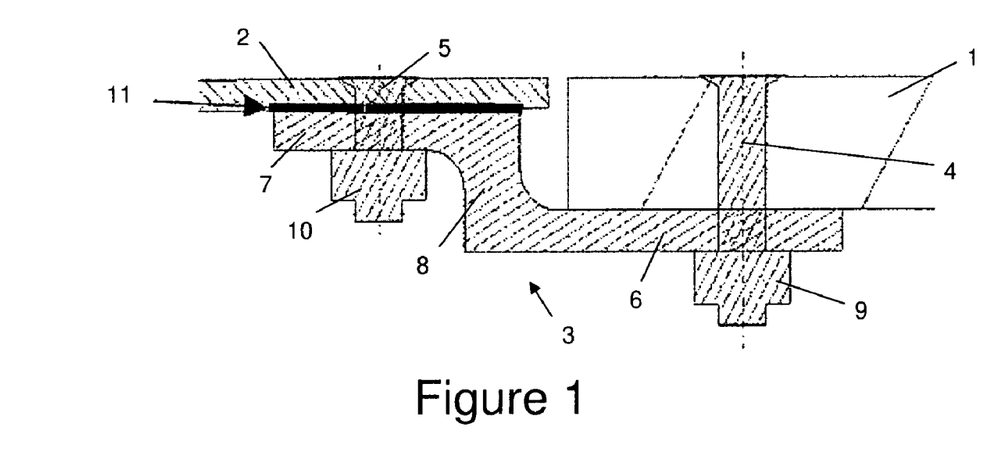
FIGS. 1 and 2 illustrate conventional butt-strap arrangements.
Figure 2:
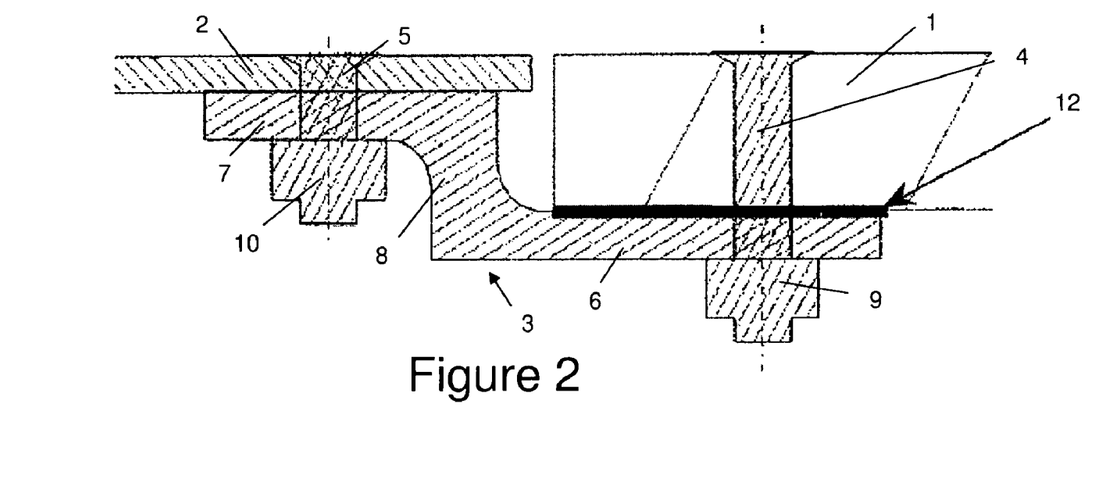

Conventional aircraft wings comprise a wing box with front and rear spars. Upper and lower wing covers are attached to the spars and extend between them to form the upper and lower boundaries of the wing box. Leading and trailing edge structures, such as panels or D-nose covers, are typically attached to the upper and lower covers with butt straps. FIGS. 1 and 2 illustrate conventional butt-strap arrangements.

An upper wing cover 1 is attached to a fixed leading edge structure 2 with a butt-strap 3, a pair of bolts 4, 5 and nuts 9, 10. The butt-strap 3 comprises upper and lower horizontal portions 6, 7 which are joined by a vertical portion 8. The lower portion 6 engages with the internal surface of the cover 1, while the upper portion 7 engages with the internal surface of the fixed leading edge structure 2.

To achieve a smooth aerodynamic surface, the external surface of the structure 2 and the external surface of the cover 1 must be aligned with each other within a strict tolerance range. To ensure that the alignment criteria are met, a packer 11 may be added between the internal surface of the structure 2 and the upper portion 7 of the butt-Strap, as shown in FIG. 1. Alternatively, as shown in FIG. 2, a packer 12 may be added between the internal surface of the cover 1 and the lower portion 6 of the butt-strap. However, as the butt-straps 3 are typically fitted in various strips across the whole span of the wing, this process can be difficult and time consuming. It may also be necessary to hand fettle the structure 2 to match the cover 1 during assembly. This adds further complexity to the process. In addition, loads can only be channelled from the structure 2 into the spar (not shown) via the cover 1.

SUMMARY OF THE INVENTION

A first aspect of the invention provides an aircraft structure comprising: a spar; a primary cover attached to the spar and extending on a first side of the spar; a secondary cover positioned on a second side of the spar and partially overlapping an internal surface of the primary cover; a bracket attached to the spar; and a spacer between the secondary cover and the bracket, wherein the spacer can be adjusted to control a distance between the secondary cover and the bracket so that the primary and secondary covers together form a substantially continuous external aerodynamic surface.

A second aspect of the invention provides a method of assembling the aircraft structure of the first aspect of the invention, the method comprising: attaching, the primary cover and the bracket to the spar; installing the secondary cover with the spacer between the secondary cover and the bracket; and adjusting the spacer so that the primary and secondary covers together form a substantially continuous external aerodynamic surface.

The invention provides an alternative to the butt-strap arrangement shown in FIGS. 1 and 2. The primary cover does not require any holes to accommodate butt strap fasteners. This is a particularly important benefit if the primary cover is formed from composite material, as drilling holes in composites significantly weakens them. Assembly time can also be reduced since it is no longer necessary to install butt-strap fasteners. The spacer provides a simple and reliable method for controlling the space between the secondary cover and the bracket, ensuring that the covers are aligned to form a substantially continuous external aerodynamic surface. By overlapping the covers it is no longer necessary to hand fettle the structure during assembly. This saves time and complexity during the assembly procedure. Furthermore, the spacers and brackets are only required at key areas along the length of the spar. As a result, there is a potential weight saving over conventional structures as butt-straps are conventionally fitted in various strips across the whole span of the aircraft structure.

Preferably the spacer is detachable from the secondary cover and the bracket, enabling the structure to be assembled and adjusted easily.

Preferably the spacer passes through a hole in the secondary cover and/or a hole in the bracket. This enables the spacer to transfer loads into the secondary cover and/or the bracket via the internal wall of the hole. Typically the spacer comprises a head which engages a recess in the external surface of the secondary cover; and a shaft which passes through a hole in the secondary cover and engages the bracket.

Preferably the shaft comprises a tip which passes through a hole in the bracket; and a shoulder which engages the bracket. In the embodiment described below the spacer is a spigot with a shaft tip which does not carry a nut.

The spacer may be adjusted in a variety of ways to control the distance between the secondary cover and the bracket. For instance the size of the spacer may be inherently adjustable by adjusting two telescoping parts, or by screwing the spacer into the bracket by an adjustable distance. However more preferably the spacer comprises an assembly of parts including a base (such as a spigot) and a detachable packer, which typically engages the bracket. The packer may be fitted to the base in situ or fitted to the base before the spacer is installed. However more preferably the size of the spacer is increased by detaching the base from the secondary cover and the bracket; attaching the packer to the base, and re-installing the assembly between the secondary cover and the bracket.

The aircraft structure may comprise for example an aerofoil such as a wing or horizontal tail plane; a vertical tail plane; or a control surface such as a flap, slat or aileron. The secondary cover may be a leading edge cover (such as a D-nose cover or leading edge panel) positioned on a front side of the spar. Alternatively the secondary cover may be a trailing edge cover (such as a trailing edge panel) positioned on a rear side of the spar.

BRIEF DESCRIPTION OF THE DRAWINGS

Embodiments of the invention will now be described with reference to the accompanying drawings, in which.

DETAILED DESCRIPTION OF EMBODIMENT(S)

Figure 3:
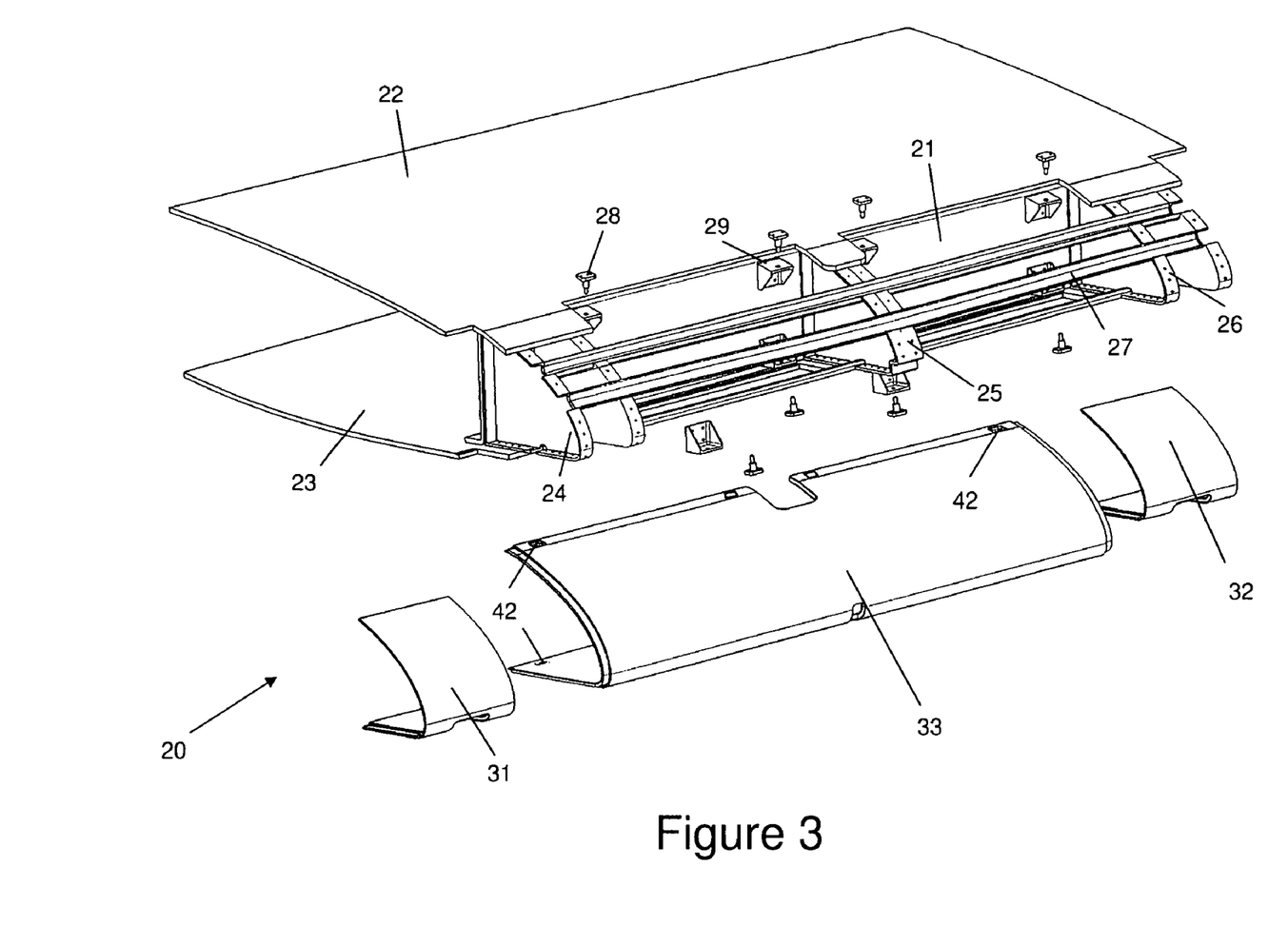
FIG. 3 is an exploded perspective view of the leading edge of part of an aircraft wing.
Figure 4:
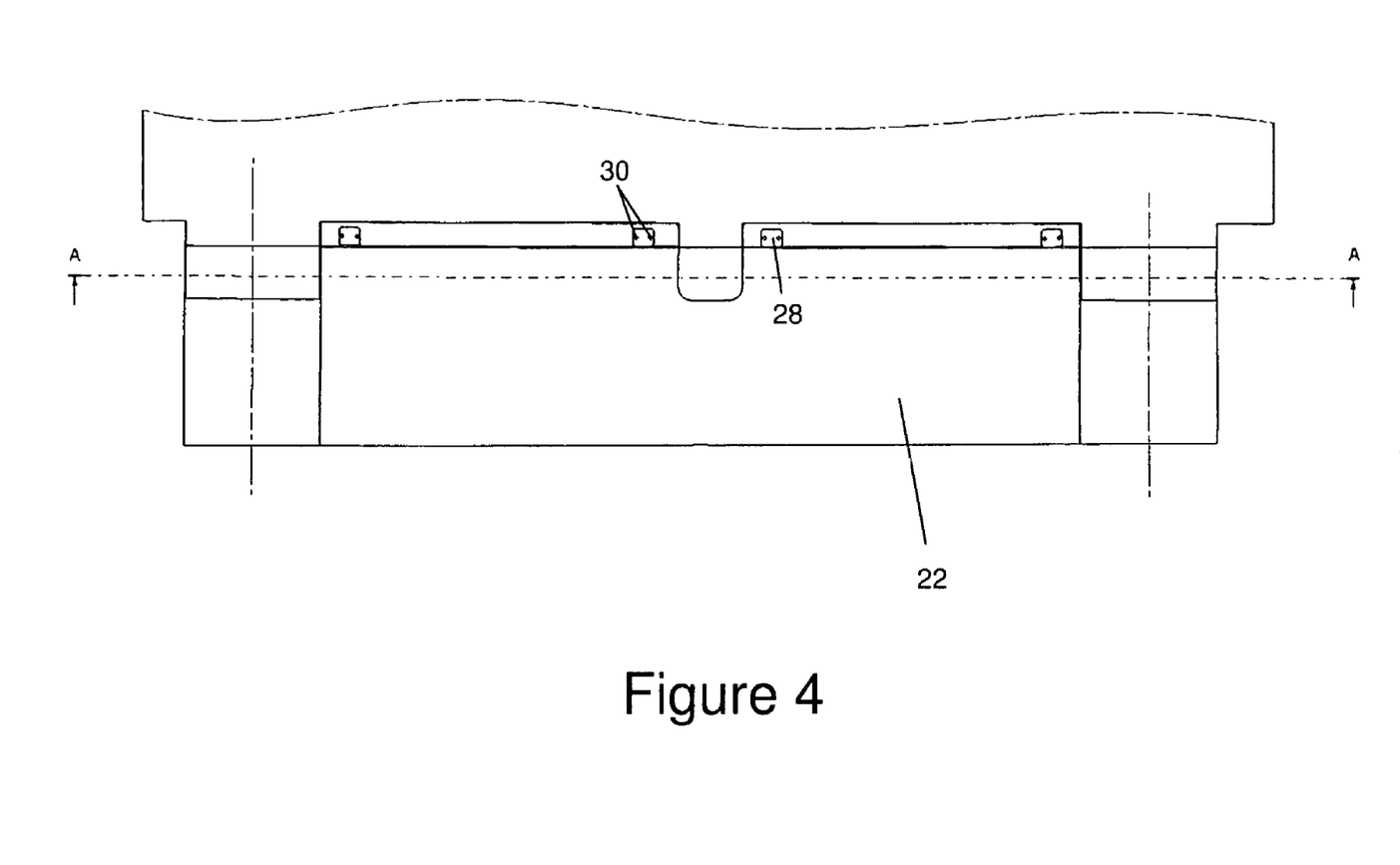
FIG. 4 is a plan view of the leading edge of the aircraft wing of FIG. 3 in its assembled state.
Figure 5:
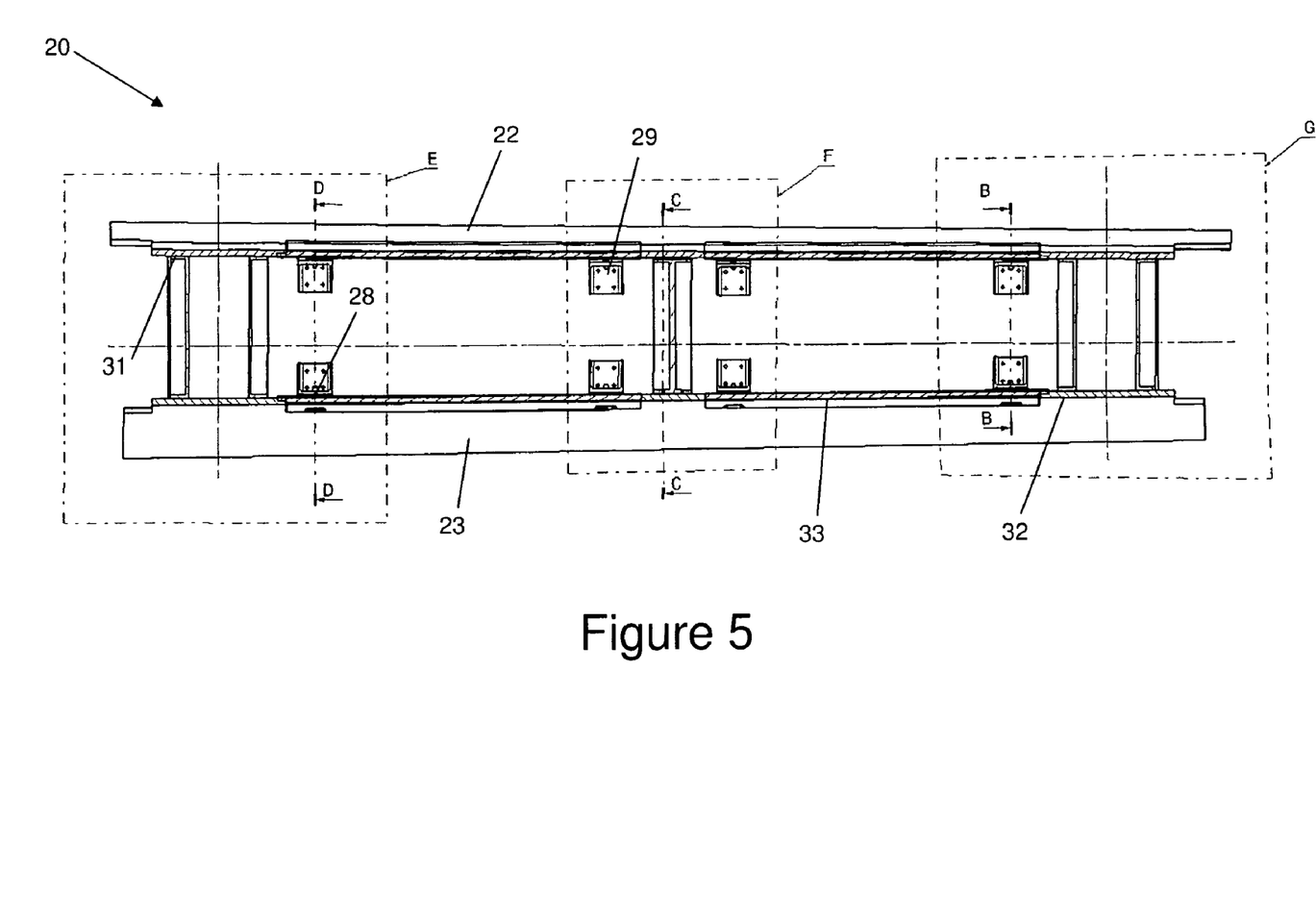
FIG. 5 is a cross section view along axis A-A as indicated in FIG. 4.

FIGS. 3-5 show part of the leading edge 20 of an aircraft wing. The wing comprises a front spar 21 and a rear spar (not shown). Upper and lower covers 22, 23 are attached to the spars and extend between them to form the upper and lower boundaries of a wing box, which is the primary structure of the wing.

Two sets of slat track ribs 24, 26 are bolted to the front spar 21 and are used to carry a movable slat (not shown). An intermediate slat rib 25 is bolted to the front spar 21 and assists in maintaining the position of the slat (not shown) whilst in its retracted position. Cable troughs 27 are also bolted to the ribs 24, 25, 26 and extend in a span-wise direction along the wing. Electrical cables (not shown) are laid in the cable troughs 27.

To achieve a smooth aerodynamic surface across the leading edge of the wing, the secondary structures forward of the front spar 21 are housed within D-nose covers 31-33. The slat track covers 31, 32 are attached to and cover the slat track ribs 24, 26 while the midsection cover 33 covers the intermediate slat rib 25. The midsection cover 33 partially overlaps with an internal surface of the shorter covers 31, 32.

The shorter covers 31, 32 are attached to the slat-track ribs 24, 26 by a series of bolts. However, although it may also be bolted to the intermediate slat rib 25, the midsection D-nose cover 33 is attached to the wing box in a different way.

D-nose cover 33 has holes 42 for receiving a series of spigots 28, each of which is detachably fastened to the cover 33 by a pair of counter-sunk bolts 30 (see FIG. 4). A corresponding series of brackets 29 are bolted to the spar 21. Movement of the spigots 28, and consequently the D-nose cover 33, is inhibited by the interaction between the spigots 28 and the brackets 29. Movement of the D-nose cover 33 is further inhibited by its overlapping interaction with the upper and lower wing box covers 22, 23 and the slat track covers 31, 32. These arrangements will be described in more detail below.

Figure 6:
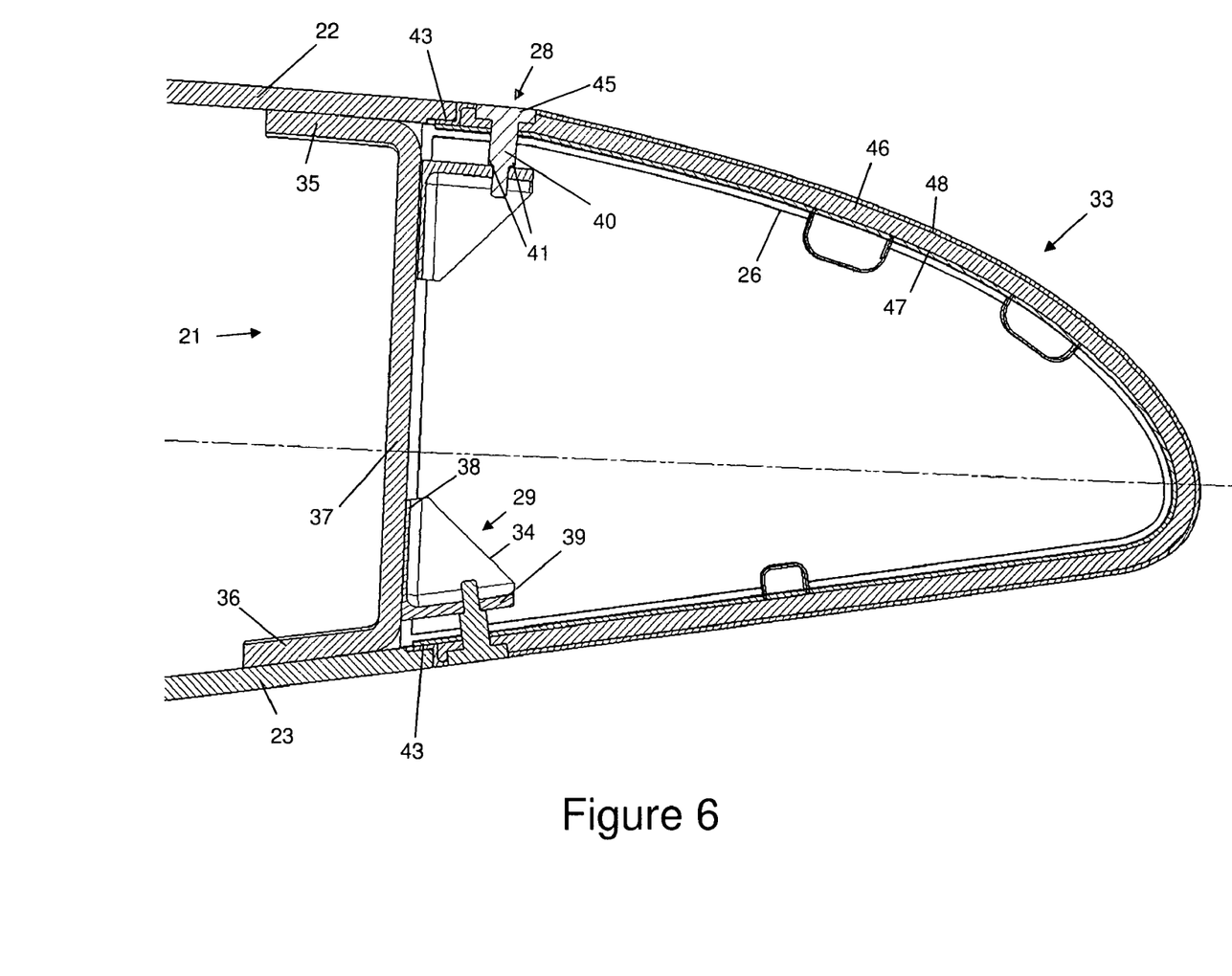
FIG. 6 is a cross-section view along axis B-B as indicated in FIG. 5.

FIG. 6 shows a cross-section taken along the axis B-B indicated in FIG. 5. The spar 21 is a C-section spar comprising upper and lower flanges 35, 36 and a web 37. The upper and lower covers 22, 23 are bolted to the upper and lower spar flanges 35, 36 respectively and slightly overhang the front of the spar web 37. The external surfaces of the upper and lower covers 22, 23 are aligned with the external surface of a respective upper or lower part of the D-nose cover 33 to form a continuous chord-wise aerodynamic external surface across the leading edge structure.

The brackets 29 comprise vertical and horizontal plates 38, 39 and stiffening side supports 34. The vertical plates 38 are bolted to the spar web 37. The horizontal plates 39 extend forward from the vertical plates 38 and have a circular hole sized to receive the tip of a shaft 40 of a spigot 28.

Each spigot comprises a head 45; and a shaft 40 with a tip passing through the bracket, and an annular shoulder 41 at the base of the tip. The head 45 of the spigot 28 is attached in a recess to the D-nose cover 33 by countersunk bolts 30 (not shown in FIG. 6, shown most clearly in FIG. 4) so that the external surface of the head 45 is flush with the external surface of the cover 33. The tip of the shaft 40 passes through the hole in the horizontal plate 39 of the bracket 29. The annular shoulder 41 engages the outer surface of the horizontal plate 39 (that is, the surface of the plate 39 facing the internal surface of the D-nose cover 33). The engagement of the shoulder 41 and the bracket 29 constrains movement of a respective upper or lower part of the D-nose cover 33 in a vertical direction towards the interior of the wing.

The D-nose cover 33 comprises a core 46 (for example a foam material such as Rohacell, or a honeycomb material such as Hexcel) which is sandwiched between internal and external composite layers 47, 48. The external composite layer 48 forms the external aerodynamic surface of the cover 33. At the aft edges of the cover 33, the external composite layer 48 is wrapped round the edge of the core 46 and also extends further aft to form a landing portion 43 in engagement with, and parallel to, the internal composite layer 47.

Each landing 43 partially overlaps with the internal surface of a respective cover 22, 23. This allows vertical loads to be transmitted from the cover 33 into the covers 22, 23 and constrains movement of the D-nose cover 33 up or down away from the interior of the wing. There is a small recess in the internal surface of the covers 22, 23 in the region where they overlap with the D-nose cover 33.

Horizontal movement of the D-nose cover 33 (fore, aft, span-wise inboard and span-wise outboard) is inhibited by the engagement of the shaft 40 and the internal wall of the hole in the bracket 29. As indicated above, the cover 33 may be held in place exclusively by the arrangement shown in FIG. 6. Alternatively, the cover 33 may also be bolted to the intermediate slat rib 25.

Unlike the butt-strap arrangement described above, the D-nose cover 33 has a direct load path to the front spar 21 via the spigot 28 and bracket 29, bypassing the covers 22, 23. Thus, the primary wing covers 22, 23 no longer have to channel as much load. Moreover, the connection between the D-nose cover 33 and the wing box covers 22, 23 does not require any holes to be drilled into the covers 22, 23. This is a particularly important benefit when the covers 22, 23 are formed from composite material as drilling holes in composites significantly weakens their structure. Note that the covers 22, 23 are part of the primary structure of the wing.

Figure 7:
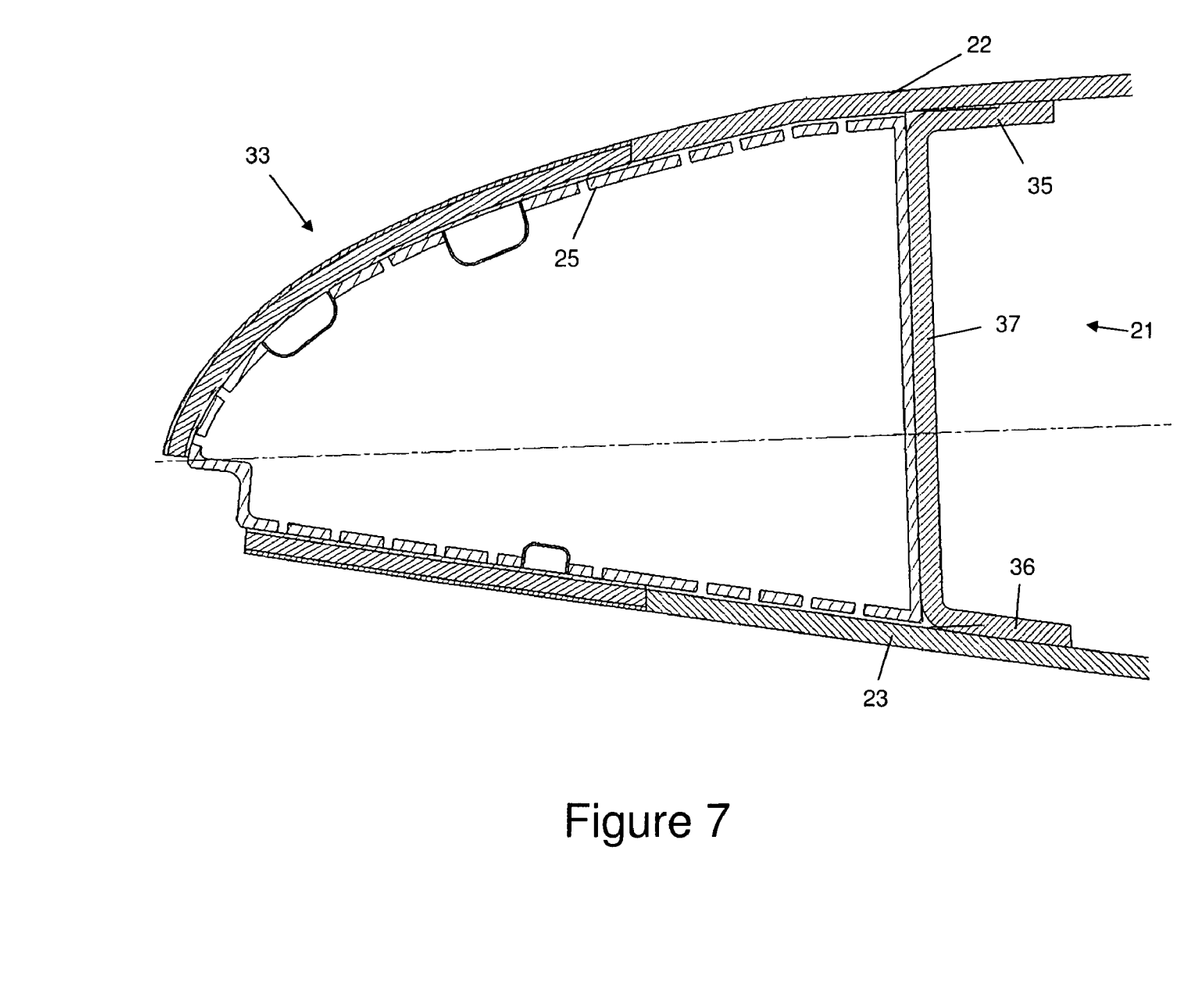
FIG. 7 is a cross-section view along axis C-C as indicated in FIG. 5.

FIG. 7 shows a cross-sectional view along the axis C-C indicated in FIG. 5. As shown in FIG. 5, the midsection D-nose cover 33 is held in place by eight spigot/bracket arrangements which are positioned inboard and outboard of this point on the span.

Figure 8:
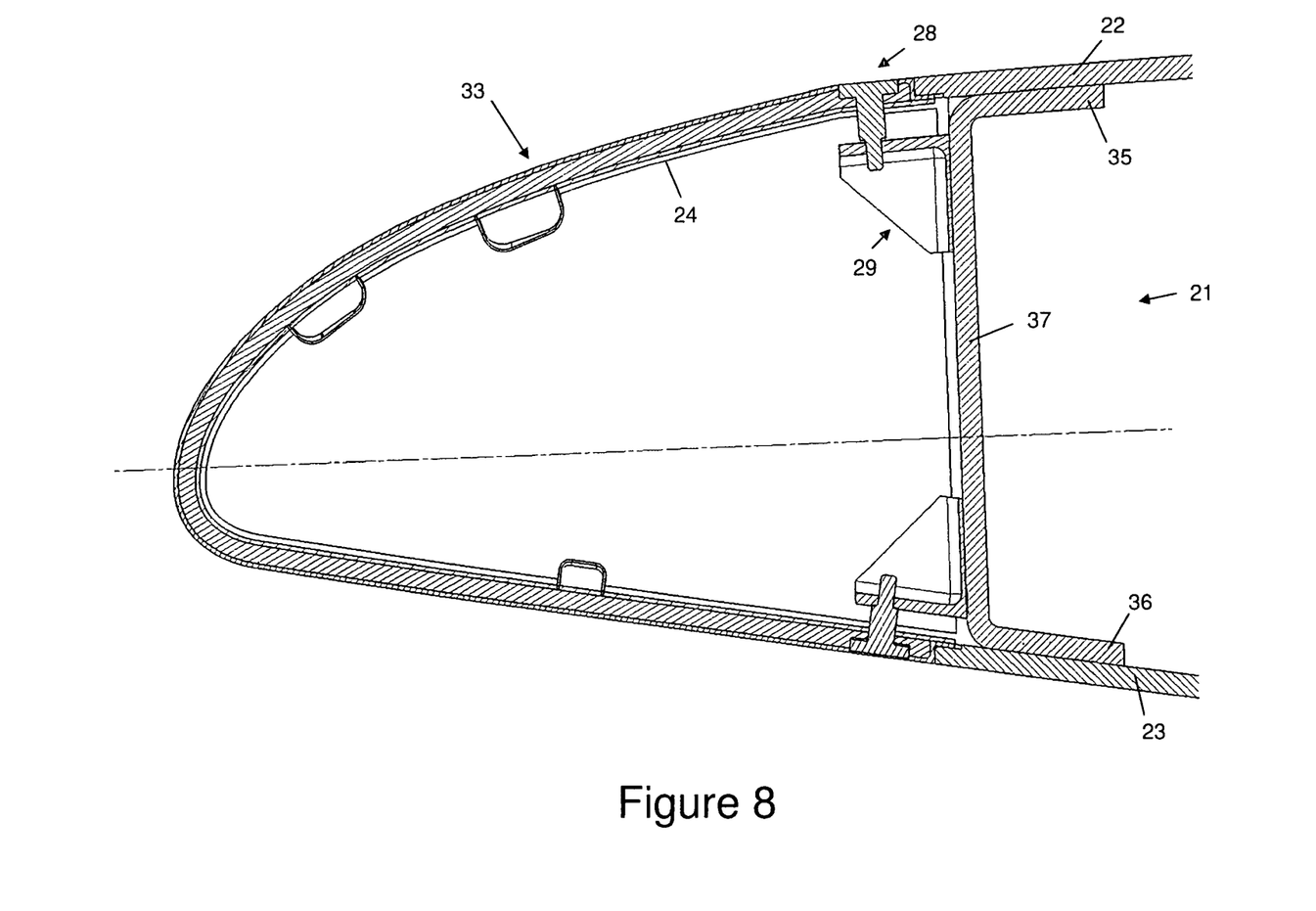
FIG. 8 is a cross-section view along axis D-D as indicated in FIG. 5.

FIG. 8 shows a cross-sectional view along the axis D-D indicated in FIG. 5. FIG. 8 is similar to FIG. 6 with the exception that, as section D-D is viewed from the opposite side to section B-B, the cover 33 appears on the left hand side of the spar 21 rather than on the right.

Figure 9:
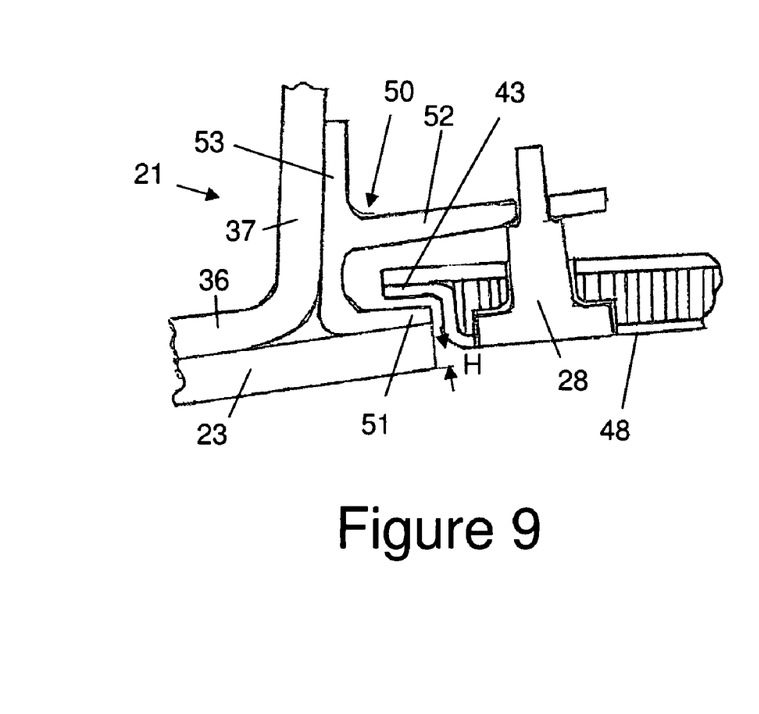
FIGS. 9 and 10 illustrate a method for assembling the aircraft structure.
Figure 10:
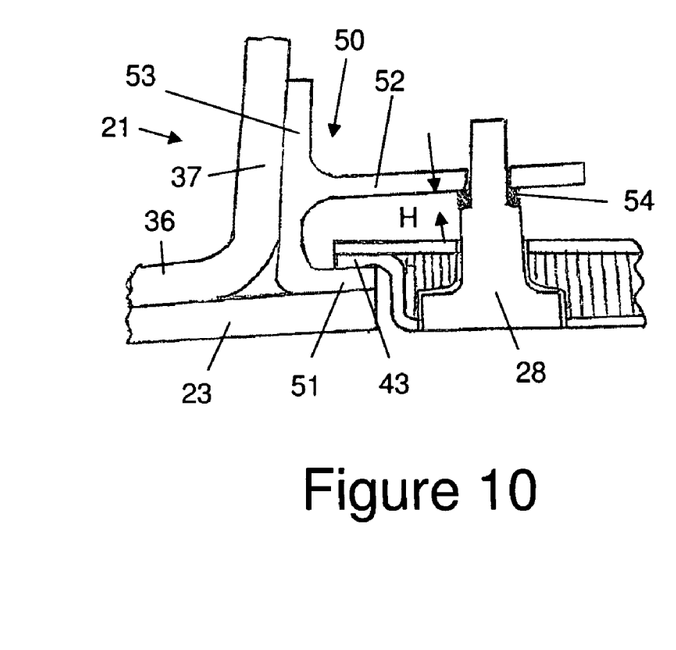

FIGS. 9-10 illustrate an alternative bracket 50 for connecting a D-nose cover to the spar 21. The arrangement is similar to that described above and the same reference numerals will be used for identical features.

The bracket 50 bolted to the spar 21 comprises a vertical plate 53, an inner plate 52 and an outer plate 51. As in FIG. 6, a similar arrangement is present at the interface (not shown) with the upper part of the D-nose cover and the upper wing box cover.

As indicated in FIG. 9, due to tolerances in the components, there may be a step with a height difference "H"

between the external surface 48 of the D-nose cover and the external surface of the wing box cover 23. This creates an uneven aerodynamic surface which will induce drag. To ensure that the D-nose cover forms a substantially continuous aerodynamic surface where it meets the wing box cover 23, and thus minimise drag, the following method is performed during assembly.

Firstly, the cover 23 and the bracket 50 are bolted to the spar. The spigot hole in the D-nose cover is then aligned with the spigot hole in the inner horizontal plate 52 of the bracket 50. The spigot 28 is then inserted through these aligned spigot holes before being attached to the D-nose cover with countersunk bolts (omitted in FIGS. 9 and 10). The height difference "H" between the external surface of the wing box cover 23 and the external surface 48 of the D-nose cover is then measured. The spigot 28 is then detached from the D-nose cover, and a ring of packing material 54 is fitted to the shoulder of the spigot. By adding the appropriate amount of packing material 54, the height of the shoulder is increased by the height "H". The spigot is then re-attached to the D-nose cover and, in doing so, the packing material 54 will engage with the plate 52 and ensure that the external surface of the D-nose cover is now aligned with that of the cover 23 as shown in FIG. 10. Thus the spigot 28 and packer 54 together act as spacer between the D-nose cover and the bracket 50, controlling the vertical distance between them.

Moreover, in FIG. 10 the outer plate 51 of the bracket is sandwiched between the cover 23 and the landing portion 43 of the D-nose cover. Vertical loads may thus be transmitted from the D-nose cover through the plate 51 and into the cover 23. The inner plate 52 of the bracket performs the same function as the plate 39 shown in FIG. 6.

The spigots 28 provide an important benefit over existing butt-strap configurations as they provide a simple and reliable method for controlling the space between the D-nose cover and the bracket. This ensures that a substantially continuous external aerodynamic surface is achieved when the upper and lower covers 22, 23 are attached to the D-nose cover. Moreover, by employing an overlapping arrangement instead of a butt-strap, it is no longer necessary to assemble the butt-straps to the covers and D-nose during assembly. This saves time and complexity during the assembly procedure. Furthermore, the spigots and brackets are only required at key areas along the wing span. As a result, there is a potential weight saving over conventional structures as butt-straps are conventionally fitted in strips along the span of the wing.

Although a method of fitting and sizing the spigot 28 has been described only in relation to the structure shown in FIGS. 9 and 10, this method may also be applied to the structure shown in FIGS. 3-8.

Although the invention has been described above with reference to one or more preferred embodiments, it will be appreciated that various changes or modifications may be made without departing from the scope of the invention as defined in the appended claims.

The invention claimed is:

1. An aircraft structure comprising: a spar; a primary cover attached to the spar and extending on a first side of the spar; a secondary cover positioned on a second side of the spar and partially overlapping an internal surface of the primary cover; a bracket attached to the spar; and a spacer between the secondary cover and the bracket, wherein the spacer can be adjusted to control a distance between the secondary cover and the bracket so that the primary and secondary covers together form a substantially continuous external aerodynamic surface.

2. The structure of claim 1 wherein the spacer is detachable from the secondary cover and the bracket.

3. The structure of claim 1 wherein the spacer passes through a hole in the secondary cover and/or a hole in the bracket.

4. The structure of claim 3 wherein the spacer comprises a head which engages a recess in the external surface of the secondary cover; and a shaft which passes through a hole in the secondary cover and engages the bracket.

5. The structure of claim 4 wherein the shaft comprises a tip which passes through a hole in the bracket; and a shoulder which engages the bracket.

6. The structure of claim 1 wherein the spacer comprises an assembly of parts including a base and a detachable packer.

7. The structure of claim 1 wherein the secondary cover comprises a core sandwiched between internal and external layers, and wherein one or both of the layers overhangs an edge of the core to form a landing portion which overlaps the internal surface of the primary cover.

8. The structure of claim 1, wherein the secondary cover comprises a laminar composite with a stack of layers, a subset of the layers being extended to form a landing portion which overlaps the internal surface of the primary cover.

9. The structure of claim 1 comprising upper and lower primary covers each attached to the spar and extending on a first side of the spar; wherein the secondary cover comprises a D-nose cover with an upper part which overlaps the internal surface of the upper primary cover and a lower part which overlaps the internal surface of the lower primary cover; upper and lower brackets attached to the spar; and upper and lower spacers, each spacer being positioned between the D-nose cover and a respective upper or lower one of the brackets, wherein each spacer is sized so that a respective upper or lower part of the D-nose cover forms a substantially continuous external aerodynamic surface with a respective upper or lower primary cover.

10. A method of assembling the aircraft structure of claim 1, the method comprising: attaching the primary cover and the bracket to the spar; installing the secondary cover with the spacer between the secondary cover and the bracket; and adjusting the spacer so that the primary and secondary covers together form a substantially continuous external aerodynamic surface.

11. The method of claim 10 further comprising measuring a height difference between the external surfaces of the covers; and adjusting the size of the spacer in accordance with the measured height difference.

12. The method of claim 11 wherein the size of the spacer is increased by detaching a base from the secondary cover and the bracket; attaching a packer to the base, the packer being sized in accordance with the measured height difference; and re-installing the base and packer between the secondary cover and the bracket.

* * * * *